Nov. 29, 1960 A. J. MOSES 2,962,648
MOTOR CONTROL APPARATUS
Filed May 5, 1958
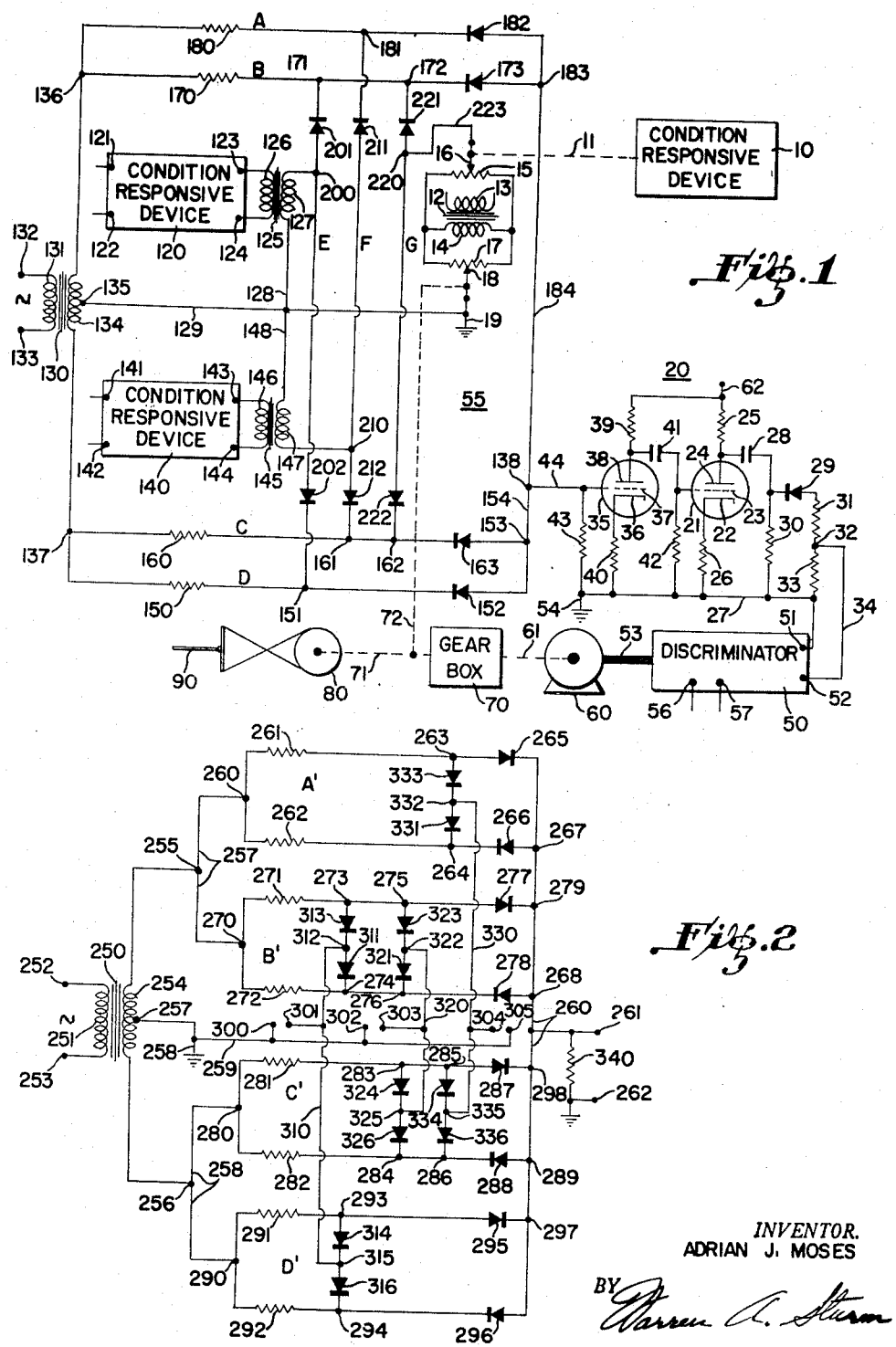
INVENTOR.
ADRIAN J. MOSES
BY
ATTORNEY United States Patent Office 2,962,648
Patented Nov. 29, 1960

2,962,648

MOTOR CONTROL APPARATUS

Adrian J. Moses, Coon Rapids, Minn., assignor to Minneapolis-Honeywell Regulator Company, Minneapolis, Minn., a corporation of Delaware Filed May 5, 1958, Ser. No. 733,107

9 Claims. (Cl. 318—489)

This invention relates generally to control apparatus and is more particularly directed to signal limiting control apparatus for utilization in a system wherein a controlled device is to be operated between predetermined limits of operation in response to a plurality of control signals, one of which may be of a nature as to cause the operation of the controlled device to exceed such predetermined limits of operation.

One example of a situation in which the application of my invention would be desirable is that of the automatic control of a dirigible craft about its pitch axis where it is desirable to limit the structural and aerodynamic stresses imposed on the craft by what might be termed a primary control signal, such as a signal from a gyroscope in an auto-pilot, so as to prevent break-up or failure of the dirigible craft. At least two schemes for accomplishing the desirable function in a control system of not imposing excessive aerodynamic and structural stresses on a dirigible craft have been proposed. One of these is adapted to prevent the application of a primary control signal that exceeds a predetermined magnitude which may be arrived at by experimentation but which may not always prevent the imposition of excessive stresses; the other has been of the type that merely disconnects the primary control signal at its source or disconnects the control member from being energized and will not, under all circumstances, prevent the imposition of excessive stresses on the craft. As will be noted below in one embodiment of my invention, I provide for control of the craft about its aero-dynamic or structural limits of operation by not only limiting the effect of a primary control signal, but also introducing a corrective signal to bring the craft back within its aero-dynamic or structural limit of operation.

It will become apparent to those skilled in the art, that the principles of the invention may also be applicable to various other situations requiring that the operation of a controlled device be rigidly restricted between predetermined limits of operation. It is also noted that the principles of my invention may also be utilized to provide a means for the selection of the lowest of a plurality of signals.

It is therefore an object of my invention to provide control apparatus wherein a first control signal may be limited and/or reversed in response to one or more of a plurality of additional control signals so as to provide operation of a controlled device between predetermined limits.

It is a further object of my invention to provide a safety control apparatus for operating control devices without exceeding the predetermined limits of operation.

It is a still further object of my invention to provide an apparatus for the selection of one of a plurality of signals.

It is a still further object of my invention to provide control apparatus wherein a controlled device is operated in accordance with the lowest of a plurality of input signals.

These and other objects and advantages of my invention will become apparent upon a reading of the appended detailed description and drawing in which: Figure 1 is a schematic and block diagram representation of control apparatus adapted to control the attitude of a dirigible craft about its pitch axis; and Figure 2 is a schematic diagram of a portion of Figure 1 that has been adapted to provide a full wave output signal.

Referring now to Figure 1, an aileron or elevator 90 for controlling the operation or attitude of a dirigible craft about its pitch axis, is shown connected through a cable member to an actuator device 80. Actuator device 80 is mechanically connected so as to be driven by a reversible motor means 60 in accordance with the signal applied to the input terminals of a discriminator 50. An amplifying means 20 is shown connected intermediate discriminator 50 and signal limiting or selection means 55. Signal selection or limiting means 55 has connected to it a plurality of input signals including a signal from a condition responsive device 10, which may be a gyroscope or other device responsive to deviations in attitude about the pitch axis of a dirigible craft, condition responsive device 120, which may be, for example, an accelerometer for providing a signal indicative of the aerodynamic load of the dirigible craft, and condition responsive device 140 for providing a signal indicative of the structural load of a dirigible craft.

Condition responsive device 10, which may be of a type having the designation number and manufactured by the Minneapolis-Honeywell Regulator Company, includes a driving means 11 connected with a wiper 16 associated with potentiometer winding 15. A second potentiometer winding 17 is connected in parallel with potentiometer winding 15 and also in parallel therewith is a secondary winding 14 of a transformer 12. Transformer 12 also has a primary winding 13 adapted to be connected to a suitable source of alternating current. Potentiometer winding 17 has associated therewith a wiper 18 that is operatively connected through a mechanical driving means 72 to the output of gear box 70 so as to provide a follow-up or balance for the bridge circuit as described above. An output signal, indicative of the deviations of the dirigible craft from a predetermined attitude appears, therefore, between potentiometer wiper 16 and potentiometer wiper 18 that it is connected to ground terminal 19.

Condition responsive device 120 includes a pair of terminals 121 and 122 for energization from a suitable source of alternating current and a pair of output terminals 123 and 124 across which is connected primary winding 126 of transformer 125. Secondary winding 127 on transformer 125 has one end connected to ground terminal 19 through lead 128 and 129 and the other end connected to a terminal 200. Device 120 may be an accelerometer of the type that has an output of reversible polarity alternating current signal which reverses in phase at predetermined adjustable gravitational acceleration. For purposes of explanation, it may be assumed that device 120 is responsive to gravitational accelerations affecting the well known aero-dynamic limit of a dirigible craft.

Condition responsive device 140 includes a pair of terminals 141 and 142 which may be connected to a suitable source of alternating current and a further pair of terminals 143 and 144 across which is connected transformer primary winding 146 on transformer 145. Secondary winding 147 of transformer 145 is connected to ground through leads 148, 129 and to terminal 210. An output signal voltage that, for purposes of explanation, may be considered representative of the gravitational acceleration acting upon the negative structural limit of a dirigible craft appears across secondary winding 147. Like condition responsive device 120, condition responsive device 140 may be of similar character.

Signal selection or limiting device 55 includes transformer 130 having a primary winding 131 and a center tapped secondary winding 134. Primary winding 131 includes terminals 132 and 133 that may be energized from a suitable source of alternating current. Center tapped secondary winding 134 includes a terminal 136 at the upper extremity, a center tap terminal 135 connected to ground terminal 19 through conductor 129, and terminal 137 connected to the lower extremity of secondary winding 134. An output terminal 138 is connected intermediate output terminals 153 and 183 through leads 154 and 184 respectively. For convenience of explanation, four possible current paths connected between secondary winding 134 and output terminal 138 have been designated as A, B, C, and D. Path A is connected to upper transformer terminal 136 and includes resistor 180, terminal 181, asymmetrical current conducting device 182 and terminal 183. Path A is part of a circuit that additionally includes a conductor 184, conductor 44, resistor 43, ground terminal 54, terminal 19, conductor 129, secondary 134. Path B interconnects transformer terminal 136 and terminal 183 and includes resistor 170, terminal 171 and terminal 172 and asymmetrical current connecting device 173. Path B is included in the complete circuit with elements 184, 138, 44, 43, 54, 19, 129, and 134. Path C is connected between lower transformer terminal 137 and terminal 153 and includes resistor 160, terminal 161, terminal 162 and asymmetrical current conducting device 163. Path D is connected between lower terminal 137 and 153 and includes resistor 150, terminal 151 and asymmetrical current conducting device 152. Parallel paths C and D are included in circuits that additionally include conductor 154, terminal 138, conductor 44, load resistor 43, ground conductors 54, 19, conductor 129 and secondary 134. Connected between terminal 171 on path B and terminal 151 on path D, are oppositely polarized asymmetrical current conducting devices 201 and 202 and an input terminal 200 for energization from condition responsive device 120. Connected between terminal 181 on path A and terminal 161 on path C are a pair of oppositely polarized asymmetrical current conducting devices 211 and 212. An input signal from condition responsive device 140 is connected intermediate the last named current conducting devices at terminal 210. Connected between terminal 172 on path B and terminal 162 on path C are asymmetrical current conducting devices 221 and 222. An input signal from potentiometer wiper 16 is connected intermediate the last named current conducting devices through lead 223 and terminal 220.

Amplifier 20 comprises a triode type vacuum tube 35 having plate electrode 38, grid control electrode 37 and cathode 36. Plate electrode 38 is connected to a terminal 62 through resistor 39. Cathode electrode 36 is connected to ground terminal 54 through lead 27 and resistor 40. Grid electrode 37 is connected to output terminal 138 on signal limiting or selection apparatus 55 through lead 44. Control grid electrode 37 is also connected to ground terminal 54 through resistor 43. Amplifier 20 also includes a second triode amplification stage utilizing a vacuum tube 21, having a plate electrode 24, a control grid electrode 23, and a cathode 22. Cathode 22 is connected to ground terminal 54 through resistor 26 and lead 27. Control grid electrode 23 is connected to plate 38 of tube 35 through capacitor 41 and to ground terminal 54 through resistor 42 and lead 27. Plate electrode 24 is connected to positive terminal 62 through resistor 25. The output of amplifier 20 appears across output terminals 32 and ground. Output terminal 32 is connected to plate electrode 24 of triode 21 through resistor 31, asymmetrical current conducting device 29 and capacitor 28. A resistor 30 and lead 27 are connected between ground electrode 54 and the junction of asymmetrical current conducting device and capacitor 28. A resistor 33 and lead 27 are connected across output terminal 32 and ground terminal 54.

Discriminator 50 which may be of the type shown and described in the W. S. Field Patent No. 2,426,497 that is assigned to the assignee of the present application has a pair of input terminals 51 and 52 connected to ground terminal 54 and output terminal 32 through leads 27 and 34 respectively.

Discriminator 50 is utilized to control the operation of reversible motor means 60 through a cable 53. Discriminator 50 also includes a pair of terminals 56 and 57 which may be energized from a suitable source of electrical energy.

The output of motor means 60 is connected to gear box 70 through a driving means 61. The output of gear box 71 is connected to actuator 80 through driving means 71 and to wiper 18 on follow up potentiometer 17 through driving means 72.

It will be readily apparent to those skilled in the art the amplifier 20, and the remainder of the system including discriminator 50 reversible motor means 60, gear box 70 and control device 90 are intended to be examples only of what might be utilized in a control system embodying the principles of my invention. It will become apparent upon studying the operation of the embodiments shown in Figure 1, that the output on the signal limiting or selecting device 55 will consist of half wave pulses of energy having a time relationship such that one half cycle of output will be 180° out of phase with the other half cycle of output and only one may exist at any particular time, and the particular half cycle occurring at the output terminal 138 is indicative of the phase or direction of control desired to correct the particular deviation of the controlled object from the predetermined desired attitude.

*Operation of Figure 1*

It will be noted in the particular application in which my invention is illustrated, that the output of condition responsive device 10 is an alternating current signal of reversible phase and of magnitude that varies with the extent of deviation from a predetermined attitude. The output of condition responsive device 120 is an alternating current signal of reversible phase and of a magnitude proportional to the deviation of, in this case, a dirigible craft from a predetermined limit of operation. Hence the signal at normal attitude or control point is large and passes through a null at the predetermined limit of operation and reverses phase and increases in magnitude as the deviation from the limit of operation increases away from the desirable control attitude or point. The same is true for the signal supplied from condition responsive device 140 except that the predetermined limit of operation may be at a different value and also the phase of the signal at any given time is opposite with respect to the signals supplied by condition responsive device 120. It is desirable in applying the principles of my invention to provide a signal from transformer 130 that is larger in magnitude than any of the signals likely to be supplied by the various condition responsive devices.

It may be helpful in understanding the operation of my invention to consider an in-phase alternating current signal as one wherein the first half cycle is positive and an out-of-phase alternating current signal as one in which the first half cycle is negative. It should be borne in mind that in this particular embodiment, the output, being of half wave form will be a negative pulse occurring during the first half cycle of the in-phase signal, and the out-of-phase signal will be a negative pulse during the second half cycle of an in-phase signal.

Further, in explaining the operation of this embodiment it will be assumed that the reference signal potential supplied by the upper half of the secondary winding, 134 of transformer 130 is an in-phase signal and the reference signal potential supplied by the lower half of transformer secondary winding 134 is an out-of-phase signal. For the moment, it will also be assumed that there is no signal being supplied from condition responsive device 10, but that the signal applied to the diodes 201, 202 interconnecting current carrying paths B and D from condition responsive device 120 is an in-phase signal, and the signal supplied to the diodes 211, 212 interconnecting current carrying paths A and C from condition responsive device 140 is an out-of-phase signal. When terminal 138 is positive relative to either of points 151, 161, 162, 171, 172, 181 there will be an output from 55.

Under this condition, during the first half cycle of the in-phase reference voltage applied to paths A and B, there will be no output through either path to output terminal 138 since the polarity of the voltage applied across the diodes in current carrying paths A and B is of the wrong polarity and they will not be conductive. During the negative half cycle of the in-phase reference signal potential, current carrying path A may be conductive to output terminal 138, but since the signal applied to the diode 211 from condition responsive device 140 is such as to cause it to be conductive, the current will flow through diode 211 rather than through current carrying path A from ground 54, resistor 43, conductors 44, 184 due to the relative impedance levels of the two possible current paths. During the same negative half cycle of the in-phase reference signal potential, current carrying path B may also be conductive, but since diode 221, connected between current carrying path B and the center tap 135 on transformer secondary winding 134, is also conductive, no current will flow to output terminal 138 from ground 54, resistor 43, and conductor 44.

Considering the out-of-phase reference signal potentials supplied from the lower half of center tapped secondary winding 134, it is seen that on the first negative half cycle, current carrying paths C and D may be conductive but, since asymmetrical current conducting devices 202 and 222 present low impedance paths to the center tap 135 from current carrying paths D and C respectively, no output appears at output terminal 138.

Assuming now that a signal from condition responsive device 10 is applied to the terminal 220 intermediate asymmetrical current conducting devices 221 and 222 connected intermediate current paths B and C that is in phase with the in-phase reference signal potential, it is seen again that during the first half cycle of the in-phase reference potential, current carrying paths A and B will not be conductive to the polarity of the voltage impressed across the asymmetrical current conducting devices 182 and 173, associated with current carrying paths A and B respectively. During the second half cycle of the in-phase reference signal potential, the asymmetrical current conducting device 211 connected to current conducting path A is biased in such a manner due to the signal applied condition responsive device 140 so as to provide a low impedance path to center tap terminal 135 and therefore no output appears at terminal 138 due to conduction through current path A. Current path B may be conductive also during the second half cycle and will supply an output to terminal 138 as long as the voltage appearing thereon remains less negative than the negative voltage applied to diode 201 from condition responsive device 120 or diode 221 from condition responsive device 10 according to whichever is the smallest in magnitude.

Going back to the out-of-phase reference signal potential and operation of lower half of circuit during such time that the signal responsive device 10 is in phase, it is seen that during the first half cycle, current conducting paths C and D may be conductive but that as asymmetrical current device 202 having a positive signal applied thereto from condition responsive device 120 presents a low impedance path to center tap terminal 135 and asymmetrical current conducting device 222 connected to current carrying path C also has a positive signal applied to it from condition response 10, both present a low impedance path to center tap terminal 135 and no output will appear at output terminal 138. During the second half cycle of the out-of-phase reference signal potential, both current carrying paths C and D are non-conductive due to the polarity of the reference signal potential carrying the second half cycle.

Therefore, an output signal appears at output terminal 138 that is zero during the first half of the cycle and consists of a negative half wave pulse during the second half cycle. This signal is applied to the control grid of amplifier tube 35 and thence to amplifier tube 21, and through asymmetrical current conducting device 29 to output terminal 32 of output amplifier 20. Asymmetrical current conducting device 29 is utilized to prevent the passage of noise and further spurious signals of positive going nature since they are not utilized in the operation of this particular embodiment. The signal is then applied to discriminator 50 and thence used to control the rotation of reversible motor means 60 according to its phase relationship with respect to a reference signal potential. Reversible motor means 60 will be operative in a direction to cause the controlled object to assume a predetermined attitude so as to null out the signals applied from condition responsive device 10.

For an out-of-phase signal from condition responsive device 10, the operation of the signal limiting or selection circuit is reversed and the negative going pulses will occur during the first half cycle of the output voltage from output terminal 138 and the second half cycle will be zero.

Assuming again the same in-phase signal being supplied by condition responsive device 10 but further assuming that the condition responsive device 120, which may be for purposes of explanation here, an accelerometer that provides an output of one phase, here an out-of-phase signal for accelerations below a predetermined limit and output of in-phase signal for accelerations existing above a predetermined limit, the operation will be explained showing how the signal from the acceleration responsive device 120 will assume control of the craft when the signal from condition responses 10 causes the craft to exceed a predetermined acceleration.

Considering the above noted explanation for the in-phase signal from condition responsive device 10, and adding to it the situation when the acceleration limit has been exceeded; the signal output of signal responsive device 120 reverses in phase to become an out-of-phase signal so that during the negative half cycle of the in-phase reference signal potential when paths A and B may be conductive, the signal, during the second half cycle of the reference signal potential, from condition responsive device 120 will be positive and provide a low impedance path to center tap terminal 135 so that there is no output from current path B and at the same time asymmetrical current conducting device 211 connected to current path A is likewise conductive and provides a low impedance path to center tap terminal 135 so that there is no output from current conducting path A. There is, therefore, no output to the remainder of the control system due to the in-phase signals supplied from the condition responsive device 10. However, during the first half cycle of the out-of-phase reference signal potential, the potential applied to asymmetrical current device 202 from condition responsive device 120 is of negative value and therefore the asymmetrical conducting device 202 will provide a low impedance path to center terminal tap 135 until the potential on current carrying path D is reduced to the magnitude of the signal supplied from condition responsive device 120. At such time current carrying path D will become conductive and an output of negative potential during the first half cycle will appear at output terminal 138. This is opposite in phase with respect to the signal from condition responsive device 10 and causes the control device to cause the controlled craft to tend to assume an attitude that does not exceed the predetermined maximum acceleration. It is thus seen that should the condition responsive device 10 call for a correction that is greater than the capabilities of the craft, due to acceleration forces, the craft will be able to correct for the deviation according to its maximum capabilities of acceleration and should it exceed at any time this acceleration, a correction signal of opposite phase will be provided to bring it within its maximum allowable capabilities.

For an out-of-phase signal supplied by condition responsive device 10 the operation, here again, is the same except that the condition responsive device 140 provides the signal indicative of acceleration.

*Figure 2*

Figure 2 is a schematic representation of a signal limiting or selecting apparatus as in 55 of Figure 1, that is adapted to provide a full wave output signal of in-phase or out-of-phase relationship with respect to a reference signal and is of value in situations wherein it is desirable to have a full wave control signal. The apparatus shown in the schematic of Figure 2 may also be utilized in the control system shown in Figure 1.

Figure 2 includes a source of reference signal potential, shown as transformer 250, a pair of output terminals 261 and 262, and a plurality of controlled current conducting paths A', B', C' and D' each having upper and lower current conducting paths that are interconnected between the output terminals and the source of reference signal potential. Means are also provided for connection to condition responsive sources of signal to be connected as set forth below.

Transformer 250 includes a primary winding 251 having terminals 252 and 253 for connection to a suitable source of alternating current and secondary winding 254 having a center tap 257 connected to ground at a terminal 258 and upper terminal 255 and a lower terminal 256. Connected to output terminal 261 is an output conductor 260 and a resistor 340 connected to output terminal 262 and ground. Upper secondary winding terminal 255 is connected to terminals 260 and 270 on current conducting paths A' and B' respectively. Lower secondary winding terminal 256 is connected to terminals 280 and 290 on current paths C' and D' respectively through a conductor 258.

The upper portion of current conducting path A' is connected to terminal 267 and output lead 260 through resistor 261, terminal 263 and asymmetrical current conducting device 265. The lower half of conducting path A' is connected with terminal 267 and output lead 260 through resistor 262, terminal 264 and asymmetrical current conducting device 266.

The upper half of current conducting path B' is connected to terminal 279 on output lead 260 through resistor 271, terminal 273, and terminal 275, and asymmetrical current conducting device 277. The lower portion of current conducting path B' is connected to terminal 268 on output lead 260 through resistor 272, terminal 274, terminal 276 and asymmetrical current conducting device 278.

The upper portion of conductive path C' is connected to terminal 298 on output lead 260 through resistor 281, terminal 283, terminal 285 and asymmetrical current conducting device 287. The lower portion of current conducting C' is connected to terminal 289 on output lead 260 through resistor 282, terminal 284, terminal 286 and asymmetrical current conducting device 288.

The upper portion of current conducting path D' is connected to terminal 297 on output lead 260 through resistor 291, terminal 293, and asymmetrical current conducting device 295. The lower portion of current conducting path D' is connected to terminal 297 on output lead 260 through resistor 292, terminal 294 and asymmetrical current conducting device 296.

Terminals 263 and 264 on conductor path A' are interconnected by asymmetrical current conducting device 333, terminal 332 and asymmetrical current conducting device 331. Terminals 285 and 286 on current conducting paths C' are interconnected by asymmetrical current conducting device 334, terminal 335 and asymmetrical current conducting device 336. A pair of input terminals, 304 and 305, suitable for connection to a source of signal potential such as might be obtained from condition responsive device 140 of Figure 1, are shown connected with terminal 305 connected to ground terminal 258 through lead 259 and terminal 304 connected to terminal 332 and 335 through lead 330.

Terminals 275 and 276 on current conductive path B' are shown interconnected through asymmetrical current conducting device 323, terminal 322 and asymmetrical current conducting device 321. Terminals 283 and 284 and current conducting paths C' are shown connected by asymmetrical current conducting device 324, terminal 325 and asymmetrial current conducting device 326. A pair of input terminals 302 and 303 such as might be utilized for the connection of a signal from a condition responsive device 10 as in Figure 1, are shown with terminal 302 connected to ground terminal 258 through lead 259 and terminal 303 connected to terminals 302 and 325 through lead 320.

Terminals 273 and 274 and conductive path B' are interconnected by asymmetrical current conducting device 313, 312 and asymmetrical current conducting device 311. Terminals 293 and 294 on current conducting path D' are interconnected through asymmetrical current conducting device 314, terminal 315 and asymmetrical current conducting device 316. A pair of input terminals 300 and 301 such as might be used for connecting the output of condition responsive device 120 are shown with terminal 300 connected to ground terminal 258 through lead 259 and terminal 301 connected to terminals 312 and 315 through lead 310.

*Operation of Figure 2*

It will be readily apparent to those skilled in the art that the actual operation of the apparatus shown in Figure 2 that is adapted to provide a full wave output rather than a half wave output of the apparatus of Figure 1 is basically the same in overall operation once the operation of one particular current conducting path is understood. The current conducting paths A', B', C', and D' correspond in function and operation to the current conducting paths A, B, C, and D of the Figure 1. Assuming again that the reference signal potential supplied by the upper half of secondary winding 254 is an in-phase alternating current signal, that is one with a first positive half cycle and a second negative half cycle, and that the signal normally applied, as in Figure 1 to input terminals 302 and 301 is in-phase signal, that the signal applied to terminals 302 and 303 is an in-phase signal, and the signal applied to input terminals 304 and 305 is an out-of-phase signal, the operation of the circuit is as follows:

On the first positive half cycle of the in-phase reference signal potential applied to current conducting paths A' and B', the upper conductors of each path may be conductive due to the polarity of the voltage impressed across the asymmetrical current conducting devices 265 and 277. At the same time, the signal applied from input terminal 304 to terminal 332, causes asymmetrical current conducting device 333 to be conductive and no current flows through the upper conductor of current conducting path A' to the output terminal. Further, the signal applied to input terminal 303 and to terminal 322 causes asymmetrical current conducting device 323 to become conductive up to the point where the magnitude of the signal exceeds the potential of the signal of 303 at which point the asymmetrical current conducting device 323 becomes conductive and an output appears at the output terminal that is equal in magnitude of the value of the signal applied to the input terminal 303. Should the signal applied to terminal 301 be smaller in magnitude than the signal applied to input terminal 303, the asymmetrical current conducting device 313 will remains conductive above the value of magnitude of this signal only and the magnitude of the output will be reduced to the magnitude of the input signal at terminal 301. For the second half cycle of the in-phase reference signal potential, the lower conductors of current conducting paths A' and B' may be conductive and the signal applied to input terminal 304, being of positive value, causes asymmetrical current conducting devices 331 to be conductive and no output appears at the output terminals due to this path. The signals applied from terminals 301 and 303 to asymmetrical current conducting devices 311 and 321 respectively allow them to be conductive when the reference signal potential exceeds the value of whichever of the input signals is the smaller and an output pulse of magnitude and polarity of the smaller of the two input signals appears at the output terminals. It may thus be seen that the output of this apparatus appears at its output terminals, is of full wave form.

The various safety limiting features mentioned above in reference to the apparatus of Figure 1 are also included in the apparatus of Figure 2 so as to enable one skilled in the art to understand the operation of the necessarily more complex circuitry utilized in Figure 2. It should now be apparent to one skilled in the art that an unlimited combination of input signals may be utilized in applying the principles of my invention to any given situation wherein it is desired to select the lowest of a plurality of signals and, if necessary, provide over riding signals at desirable control set points.

In a reduction to practice of my invention, it was discovered that the use of one megohm resistor, and type HD6006 Hughes Products diodes were suitable for the operation of Figure 2 and that like resistors and diodes were suitable for the operation of the signal selection and limiting circuit of Figure 1.

While certain specific embodiments of the invention have been shown and described, it is to be understood that the particular modifications shown have been for the purpose of illustration only and that modifications other than these will be readily apparent to those skilled in the art. Therefore, I intend to be limited solely by the scope of the appended claims in which I claim:

1. In apparatus of the class described, means for limiting the effect of a control signal according to predetermined limits, comprising; a controlled load means; a source of reference potential for supplying a signal which is normally larger than a signal to be limited; a source of control signal; first and second sources of limiting signal; a plurality of limiting means connected to said source of reference potential and to said load means, and arranged to intermittently establish conductive paths therebetween; and means connecting said control signal and said first and second limiting signals to said limiting means so that the conductivity of said paths is controlled by said signals.

2. In control apparatus, means for selecting the lowest of a plurality of alternating current signals of reversible phase and variable magnitude, comprising; transformer means having a primary winding and a center-tapped secondary winding; a source of alternating voltage connected to said primary winding; a plurality of electric valves; means for connecting certain of said valves intermediate the extremities of said secondary winding and an output terminal; load means connected intermediate said output terminal and the center tap on said secondary winding; means for connecting other of said valves in series pairs intermediate the extremities of said secondary windings; and a plurality of alternating voltage sources of signal connected intermediate the junction of each of said last named pairs of electric valves and the center tap on said secondary winding, said valves being oriented to cause a signal to reach said output terminal and said load that corresponds to the lowest of the signals from said alternating voltage sources.

3. Apparatus for selecting the lowest of a plurality of signals comprising; a source of reference potential; a load device connected to receive a signal from said reference potential source; means for generating; a plurality of control signals; a plurality of potential limiting devices connected to control the magnitude of the signal from said source of reference potential; and means connecting one of each of said control signals to one of each said potential limiting devices, and in controlling relationship thereto, so that the magnitude of said signal from said source of reference potential received at said load device is limited to the magnitude of the smallest of said plurality of control signals.

4. Safety control apparatus for a craft for limiting the operation of said craft to predetermined limits of operation, comprising; operating means; means for generating a first signal of variable magnitude and reversible sense; means for generating a second signal of variable magnitude and reversible sense for limiting the operation of a craft in a first sense; means for generating a third control signal of variable magnitude and reversible sense for limiting the operation of a craft in a second sense; a plurality of valves individually connected intermediate said generating means and said operating means and poled to conduct and thereby limit said first signal to the magnitude of said second signal when said first signal is of one sense, and to the magnitude of said third signal when said first signal is of another sense.

5. In control apparatus for a dirigible craft, means for limiting the effect of a control signal so that the structural limits of operation of said craft are not exceeded, comprising; a source of reference potential; a first condition responsive source of control signal; a second condition responsive source of signal corresponding to a first structural limit of operation of said craft; a third condition responsive source of signal corresponding to a second structural limit of operation of said craft; first, second and third voltage limiting devices; means connecting said first, second and third limiting devices to said source of reference potential; means individually connecting said first, second and third signal sources to said first, second and third limiting devices respectively; means connecting said source of reference potential to a control device; and means connecting said control device to a means for controlling the operation of a dirigible craft, said limiting devices effective to limit the signal received at said control device from said reference potential source to the smaller of said first, second and third signals.

6. Control apparatus for maintaining the operation of a controlled device between predetermined limits of operation comprising; a first source of signal of variable magnitude and reversible sense for normally controlling the operation of a controlled device; a second source of signal of variable magnitude and of reversible sense for generating a signal corresponding to a first predetermined limit of operation; a third source of signal of variable magnitude and of reversible sense for generating a signal corresponding to a second predetermined limit of operation; signal combining means for substituting said second signal for said first signal when said first signal exceeds a predetermined limit for one sense of said first signal and for substituting said third signal for said first signal when said first signal exceeds a predetermined limit for the other sense of said first signal; means connecting said sources of signal to said signal combining means; and means connecting said signal combining means to said controlled device to thereby operate said controlled device between said first and second predetermined limits of operation.

7. Control apparatus for a dirigible craft, comprising: a source of reference potential including a center-tapped secondary winding of a transformer; a plurality of valves connected in pairs across said secondary winding; means for generating a first phase limiting signal that becomes smaller in magnitude as a craft limiting condition is approached, and reverses in phase while increasing in reverse-phase magnitude as said craft limiting condition is increasingly exceeded; means for connecting said generating means intermediate the junction of at least one of said pairs of valves and the center tap on said secondary winding; means for generating a condition responsive control signal of reversible phase; means for connecting said last mentioned generating means intermediate the junction of at least one other of said pairs of valves and the center tap on said secondary winding; and means including a load device connected to the extremities of said secondary winding and operated responsive to a first phase signal to move said craft toward said limiting condition, and responsive to a reverse phase signal to move said craft away from said limiting condition, said valves being effective to limit the signal received at said load device from said reference potential source to the smaller of said limiting and control signals when they are of equal phase, and to said limiting signal when said limiting and control signals are of opposite phase.

8. Control apparatus for a dirigible craft as claimed in claim 7, additionally comprising: means for generating a reverse-phase limiting signal that becomes smaller in magnitude as a second craft limiting condition is approached, and reverses to a first-phase signal while increasing in first-phase magnitude as said second craft limiting condition is increasingly exceeded; and means for connecting said last mentioned generating means intermediate the junction of at least one other of said pairs of valves and the center tap on said secondary winding, said valves effective to limit the signal received at said load device in accordance with both said limiting signals and said control signal, to thereby control said craft between predetermined limits of operation.

9. In a control system for a dirigible craft for maintaining said craft in a desired flight condition, in combination: a reference source of alternating voltage having two terminals; a circuit connected across said terminals, said circuit including an impedance load device and a load diode in series relation therewith; means including a source of alternating voltage control signal responsive to the flight condition of the craft; a first diode; means connecting said control signal source and first diode in electrical series relation and to said circuit to shunt said load device and load diode; a second source of alternating voltage control signal responsive to the acceleration of said craft, said signal being of opposite phase when a predetermined acceleration is exceeded by said craft; a second diode; means connecting said second diode and acceleration signal source in series and to said circuit in shunting relation to said load device and load diode, whereby when said first control signal source applies a negative voltage to the first diode to permit the current from the reference source to pass through said load device and load diode said acceleration signal source, when the acceleration limit is exceeded, applies a positive voltage to the second diode to form a low impedance path thereby shunting said load device and load diode.

References Cited in the file of this patent

UNITED STATES PATENTS

| | | |
|---|---|---|
| 2,735,051 | Gille | Feb. 14, 1956 |
| 2,765,435 | McWilliams et al. | Oct. 2, 1956 |